(12) United States Patent
Pedersoli

(10) Patent No.: US 10,346,877 B1
(45) Date of Patent: Jul. 9, 2019

(54) ADVERTISING AND MARKETING PLATFORM

(71) Applicant: Maher Pedersoli, Tucson, AZ (US)

(72) Inventor: Maher Pedersoli, Tucson, AZ (US)

(*) Notice: Subject to any disclaimer, the term of this patent is extended or adjusted under 35 U.S.C. 154(b) by 0 days.

(21) Appl. No.: 14/717,591

(22) Filed: May 20, 2015

Related U.S. Application Data

(63) Continuation-in-part of application No. 13/692,217, filed on Dec. 3, 2012, now abandoned.

(51) Int. Cl.
G06Q 30/02 (2012.01)
G06K 9/00 (2006.01)
H04W 4/21 (2018.01)
G06F 16/583 (2019.01)

(52) U.S. Cl.
CPC ....... *G06Q 30/0267* (2013.01); *G06F 16/583* (2019.01); *G06K 9/00664* (2013.01); *G06Q 30/0273* (2013.01); *H04W 4/21* (2018.02)

(58) Field of Classification Search
None
See application file for complete search history.

(56) References Cited

U.S. PATENT DOCUMENTS

| | | | |
|---|---|---|---|
| 7,124,091 B1 | 10/2006 | Khoo et al. | |
| 7,930,384 B1 | 4/2011 | Lester et al. | |
| 2006/0074748 A1 | 4/2006 | Kline et al. | |
| 2007/0094082 A1 | 4/2007 | Yruski et al. | |
| 2008/0262914 A1 | 10/2008 | Suveyke et al. | |
| 2009/0232354 A1* | 9/2009 | Camp, Jr. | G06Q 30/02 382/103 |
| 2009/0285492 A1* | 11/2009 | Ramanujapuram | G06F 17/30247 382/209 |
| 2009/0299862 A1 | 12/2009 | Fan et al. | |
| 2009/0327869 A1 | 12/2009 | Fan et al. | |
| 2012/0054112 A1* | 3/2012 | Gormish | G06Q 10/103 705/301 |
| 2012/0123871 A1 | 5/2012 | Svendsen et al. | |
| 2012/0317110 A1 | 12/2012 | Butterfield et al. | |
| 2013/0073336 A1 | 3/2013 | Heath | |

(Continued)

FOREIGN PATENT DOCUMENTS

| | | |
|---|---|---|
| EP | 2145258 A1 | 1/2010 |
| EP | 2308018 A2 | 4/2011 |
| WO | WO 2015/128758 A1 | 9/2015 |

OTHER PUBLICATIONS

Xi Chen, Jouko Hyvakka and Markus Koskela, Jun. 1, 2010; 2010 International Workshop on Content Based Multimedia Indexing (CBMI) (pp. 1-5) (Year: 2010).*

*Primary Examiner* — Sam Refai
*Assistant Examiner* — Rashida R Shorter
(74) *Attorney, Agent, or Firm* — Kang S. Lim

(57) ABSTRACT

A method and system of leasing a virtual advertisement product. An advertisement activation data having an image capture component is received from a mobile device. The advertisement activation data includes an image data, a coded data, a text data, and/or a multimedia data captured by the mobile device. Temporal data and/or a geographical data concerning the advertisement activation data is extracted from the mobile device. A repository database for a stored copy of the advertisement activation data is queried and the advertisement activation data is added to the repository database if the stored copy of the advertisement data is not found.

20 Claims, 20 Drawing Sheets

(56) References Cited

U.S. PATENT DOCUMENTS

| | | |
|---|---|---|
| 2013/0073388 A1 | 3/2013 | Heath |
| 2013/0073473 A1 | 3/2013 | Heath |
| 2015/0134688 A1 | 5/2015 | Jing et al. |
| 2016/0203586 A1 | 7/2016 | Chang et al. |

* cited by examiner

US 10,346,877 B1

ADVERTISING AND MARKETING PLATFORM

CROSS REFERENCE

This application claims priority to U.S. patent application Ser. No. 13/692,217, filed Dec. 3, 2012, the specification(s) of which is/are incorporated herein in their entirety by reference.

FIELD OF THE INVENTION

The present invention relates to a virtual advertisement platform designed to lease a virtual advertisement product to an advertiser based on temporal and geographical data related to an image captured by a user of a mobile device.

BACKGROUND OF THE INVENTION

The current climate of marketing may emphasize the importance of selective advertising. Specifically, modern advertising may benefit by focusing on an individual's age, gender, tastes, preferences, travel history, web search history, and other details associated with the individual. Advertising based on these criteria may have limited success in today's climate of mobile computing, however. Advertising firms may not utilize the rise of GPS-enabled, camera equipped mobile devices in everyday use. As such, a great amount of advertisement space may be ignored, leading to a loss of sales, customers, and revenue.

The present invention provides a machine learning image searching method that obviates the foregoing problems of continuous image analysis by user's phone and a server in an image based ad placement system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

Disclosed is a method to lease a virtual advertisement product to an advertiser based on temporal and geographical data related to an image captured by a user of a mobile device.

In one embodiment of this method, a loose network of associated mobile devices participate in partial image processing, feature vector formation and analysis, etc. An associated mobile device is one that is connected to the services of this method's server. A loose network means that mobile devices may join and detach from the network at arbitrary times. This kind of network can, in fact, work to provide greater processing throughput than can be provided by a lone server, as shown in the early 1990's by David Galemter et al, at Yale, working on the Linda Coordination Language. Despite the fact that individual mobile devices may provide less than a small fraction of the processing power of a server, many hundreds, or thousands, working together through the loose network, performing parcels of useful work through an associative memory held at the server, may provide significantly more processing power than the server alone.

A loose network is indicated here to mean that mobile devices offer up spare processor cycles while they remain connected to the service. These cycles may be utilized by the service to perform necessary, but small, stages of image processing, feature vector formation, and analysis. When the user of a mobile device commands attention, the processor may divert its attention, away from network participation, and back to the user. And when the user disconnects the mobile device from the service, the available processor cycles may depart from the loose network altogether. Failure to return a processed result to the server may not be an issue.

An associative memory at the server might track progress by storing tuples of raw data, tuples of partially processed data, and tuples of final results. If multiple mobile devices are tasked to perform redundant efforts, their redundancy may provide robustness against individual mobile devices departing from the network. Data parceled out to mobile devices that fail to elicit partial results from some of the mobile devices may well be provided by other mobile devices also working on the same data task. In any event, failure to receive partial results may not be fatal, and might merely leave the original unprocessed data remaining in the associative memory for later tasking to available mobile devices.

In one aspect, a method of leasing a virtual advertisement product performed by a server comprising a processor coupled to a memory, the memory having instructions stored thereon which, when executed by the processor, cause the server to perform the method, includes receiving an advertisement activation data from a mobile device comprising an image capture component. The advertisement activation data comprises an image data, a coded data, a text data, and/or a multimedia data captured by the mobile device. The method also includes extracting a temporal data and/or a geographical data concerning the advertisement activation data from the mobile device.

Furthermore, the method includes querying a repository database for a stored copy of the advertisement activation data. The method also involves adding the advertisement activation data to the repository database if the stored copy of the advertisement data is not found. Also, the method includes constructing a virtual advertising product based on the advertisement activation data. The method additionally comprises calculating an optimal price for the virtual advertising product by analyzing the temporal data and/or the geographical data of the advertisement activation data. The method also includes leasing the virtual advertising product to an advertiser based on the optimal price calculated.

The method may involve generating a customized advertisement to a user of the mobile device based on an analysis of the temporal data, the geographical data, the optimal price, and/or a content of the advertisement activation data. The advertisement activation data may be captured through a third-party photography sharing application implemented on the mobile device and the customized advertisement may be presented through the third-party photography sharing application implemented on the mobile device. The customized advertisement may comprise a text advertisement, an advertisement image, and/or a multimedia advertisement. The method may also involve decoding the advertisement activation data when the advertisement activation data is the coded data comprising a quick response (QR) code, a scan code, a bar code, a matrix code, and/or a graphic code. The method may further include extracting a set of user data from the user of the mobile device and taking into account the set of user data when calculating the optimal price for the virtual advertising product. The set of user data may comprise a gender data of the user, an age data of the user, and/or a contact information data of the user. The method may also involve continuously configuring the optimal price for the virtual advertising product based on an analysis of the set of user data and/or a popularity metric of the virtual advertising product. The method may also involve tracking the viewing focus of the user, monitoring picture translation, rotation, and zooming gestures of the user, to further refine the understanding of salient features of an image deemed interesting by the user and more narrowly focusing the advertisements.

In another aspect, a server to lease a virtual advertisement product performed by a server comprising a processor coupled to a memory, the memory having instructions stored thereon which, when executed by the processor, cause the server to receive an advertisement activation data from a mobile device comprising an image capture component. The advertisement activation data comprises an image data, a coded data, a text data, and/or a multimedia data captured by the mobile device. The server also includes instructions to extract a temporal data and/or a geographical data concerning the advertisement activation data from the mobile device. The server further comprises instructions to query a repository database for a stored copy of the advertisement activation data, and add the advertisement activation data to the repository database if the stored copy of the advertisement data is not found. The server also comprises instructions to construct a virtual advertising product based on the advertisement activation data and calculates an optimal price for the virtual advertising product by analyzing the temporal data and/or the geographical data of the advertisement activation data. The server further comprises instructions to lease the virtual advertising product to an advertiser based on the optimal price calculated.

The server may also comprise instructions to generate a customized advertisement to a user of the mobile device based on an analysis of the temporal data, the geographical data, the optimal price, and/or a content of the advertisement activation data. The advertisement activation data is captured through a third-party photography sharing application implemented on the mobile device and the customized advertisement is presented through the third-party photography sharing application implemented on the mobile device. The customized advertisement comprises a text advertisement, an advertisement image, and/or a multimedia advertisement. The server may also comprise instructions to decode the advertisement activation data when the advertisement activation data is the coded data comprising a quick response (QR) code, a scan code, a bar code, a matrix code, and/or a graphic code. The server may further comprise instructions to extract a set of user data from the user of the mobile device and take into account the set of user data when calculating the optimal price for the virtual advertising product. The set of user data may comprise a gender data of the user, an age data of the user, and/or a contact information data of the user. The server may also comprise instructions to continuously configure the optimal price for the virtual advertising product based on an analysis of the set of user data and/or a popularity metric of the virtual advertising product.

The methods disclosed herein may be implemented in any means for achieving various aspects, and may be executed in a form of machine readable medium embodying a set of instruction that, when executed by a machine, causes the machine to perform any of the operations disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DESCRIPTION OF PREFERRED EMBODIMENTS

Referring now to FIG. 1-20, the present invention features a method to lease a virtual advertisement product to an advertiser based on temporal and geographical data related to an image captured by a user of a mobile device.

Figure 1:
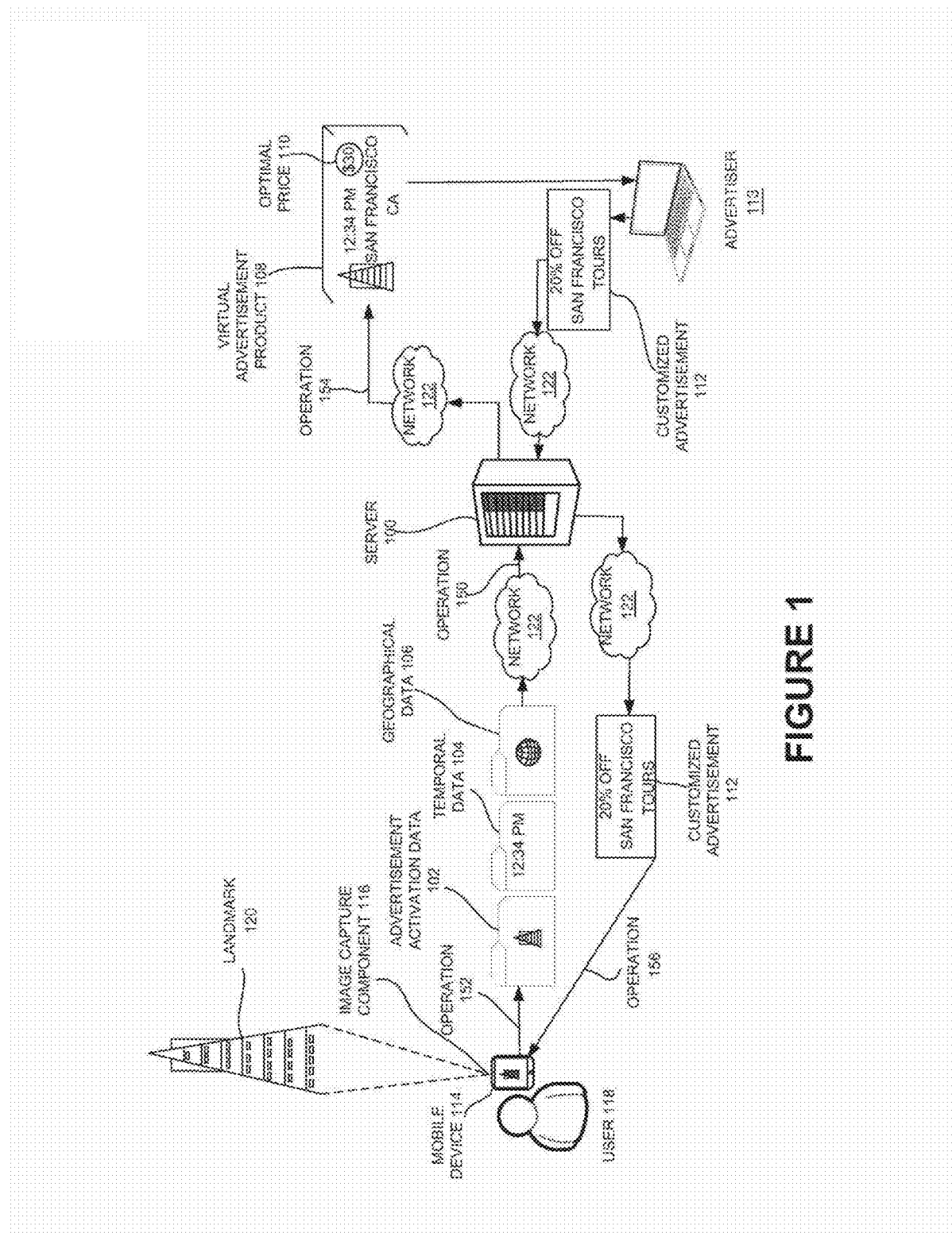
FIG. 1 is a schematic diagram of capturing an image of a landmark to generate a customized advertisement to a user of a mobile device based on an extraction of a temporal data and a geographical data of an advertisement activation data and a calculation of an optimal price of a virtual advertisement product based on the customized advertisement, according to one embodiment.

FIG. 1 is a schematic diagram of capturing an image of a landmark 120 to generate a customized advertisement 112 to a user 118 of a mobile device 114 based on an extraction of a temporal data 104 and a geographical data 106 of an advertisement activation data 102 and a calculation of an optimal price 110 of a virtual advertisement product 108 based on the customized advertisement 112, according to one embodiment.

Specifically, the advertisement activation data 102 may be captured through a third-party photography sharing application implemented on the mobile device 114. The customized advertisement 112 may be presented through the third-party photography sharing application implemented on the mobile device 114. The customized advertisement 112 may comprise a text advertisement, an advertisement image, and/or a multimedia advertisement. A customized advertisement 112 may be generated to a user 118 of the mobile device 114 based on an analysis of the temporal data 104, the geographical data 106, the optimal price 110, and/or a content of the advertisement activation data 102.

When the advertisement activation data 102 is a coded data comprising a quick response (QR) code, a scan code, a bar code, a matrix code, and/or a graphic code, the advertisement activation data 102 may be decoded. In addition, a set of user data may be extracted from the user 118 of the mobile device 114, and the set of user data may be taken into account when calculating the optimal price 110 for the virtual advertisement product 108. The set of user data may comprise a gender data of the user 118, an age data of the user 118, and/or a contact information data of the user 118. The optimal price 110 for the virtual advertisement product 108 may be continuously configured based on an analysis of the set of user data and/or a popularity metric of the virtual advertisement product 108.

In one embodiment, the leasing of a virtual advertisement product 108 performed by a server 100 comprising a processor 202 coupled to a memory 200, the memory 200 having instructions stored thereon which, when executed by the processor 202, cause the server 100 to perform the method, includes receiving an advertisement activation data 102 from a mobile device 114 comprising an image capture component 116. The advertisement activation data 102 comprises an image data, a coded data, a text data, and/or a multimedia data captured by the mobile device 114. In addition, a temporal data 104 and a geographical data 106 concerning the advertisement activation data 102 from the mobile device 114 are extracted.

FIG. 1 additionally depicts the construction of a virtual advertisement product 108 based on the advertisement activation data 102. An optimal price 110 for the virtual advertisement product 108 is calculated by analyzing the temporal data 104 and the geographical data 106 of the advertisement activation data 102. The virtual advertisement product 108 is then leased to an advertiser 113 based on the optimal price 110 calculated.

Figure 2:
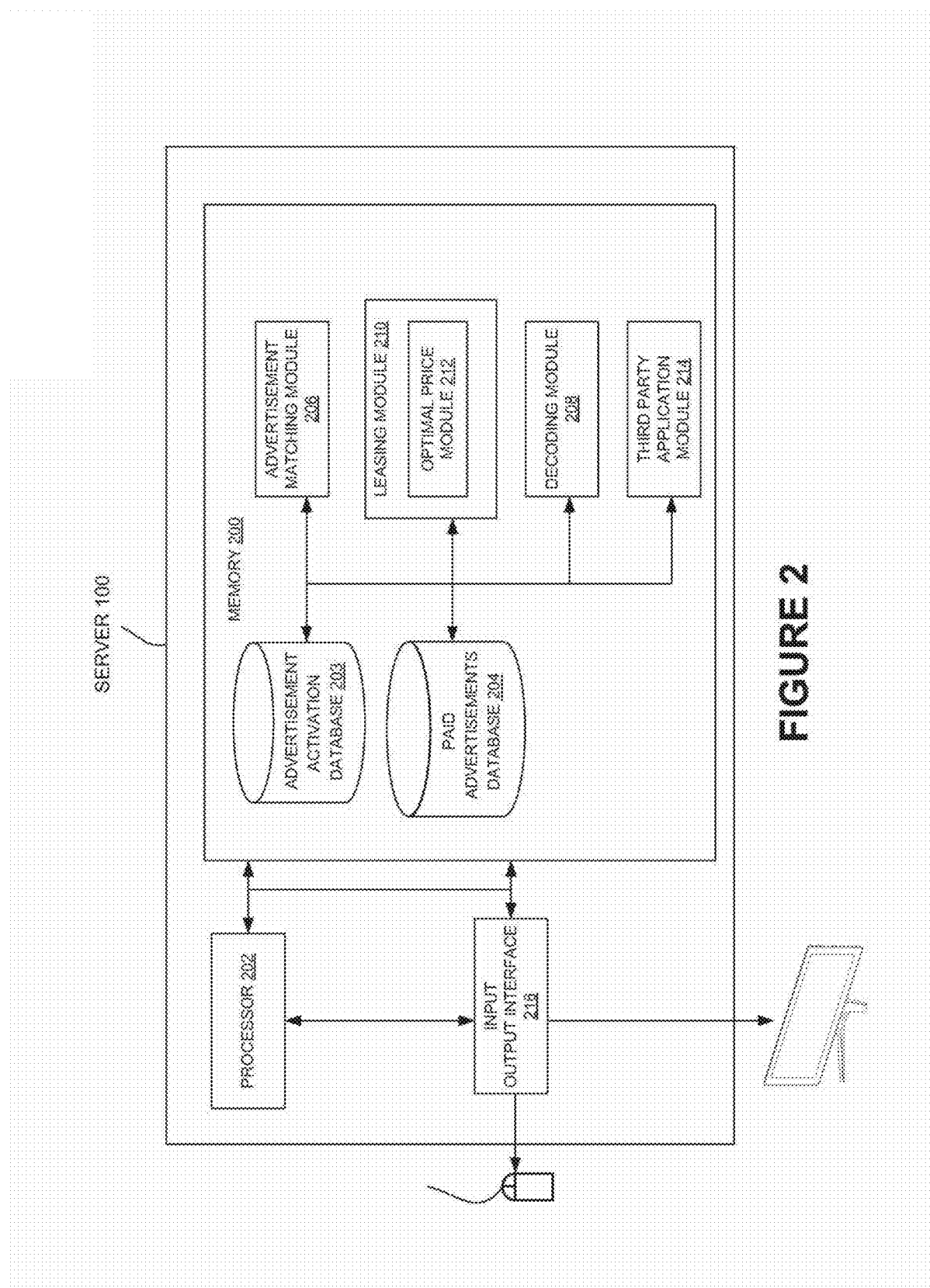
FIG. 2 is a functional block diagram depicting components of the server having a processor communicatively coupled to an input/output interface and a memory, the memory comprising an advertisement activation database, a paid advertisements database, an advertising matching module, a leasing module, a decoding module, and a third party application module, according to one embodiment.

FIG. 2 is a functional block diagram depicting components of the server 100 having a processor 202 communicatively coupled to an input/output interface 216 and a memory 200, the memory 200 comprising an advertisement activation database 203, a paid advertisements database 204, an advertising matching module 206, a leasing module 210, a decoding module 208, and a third party application module 214, according to one embodiment.

Figure 3:
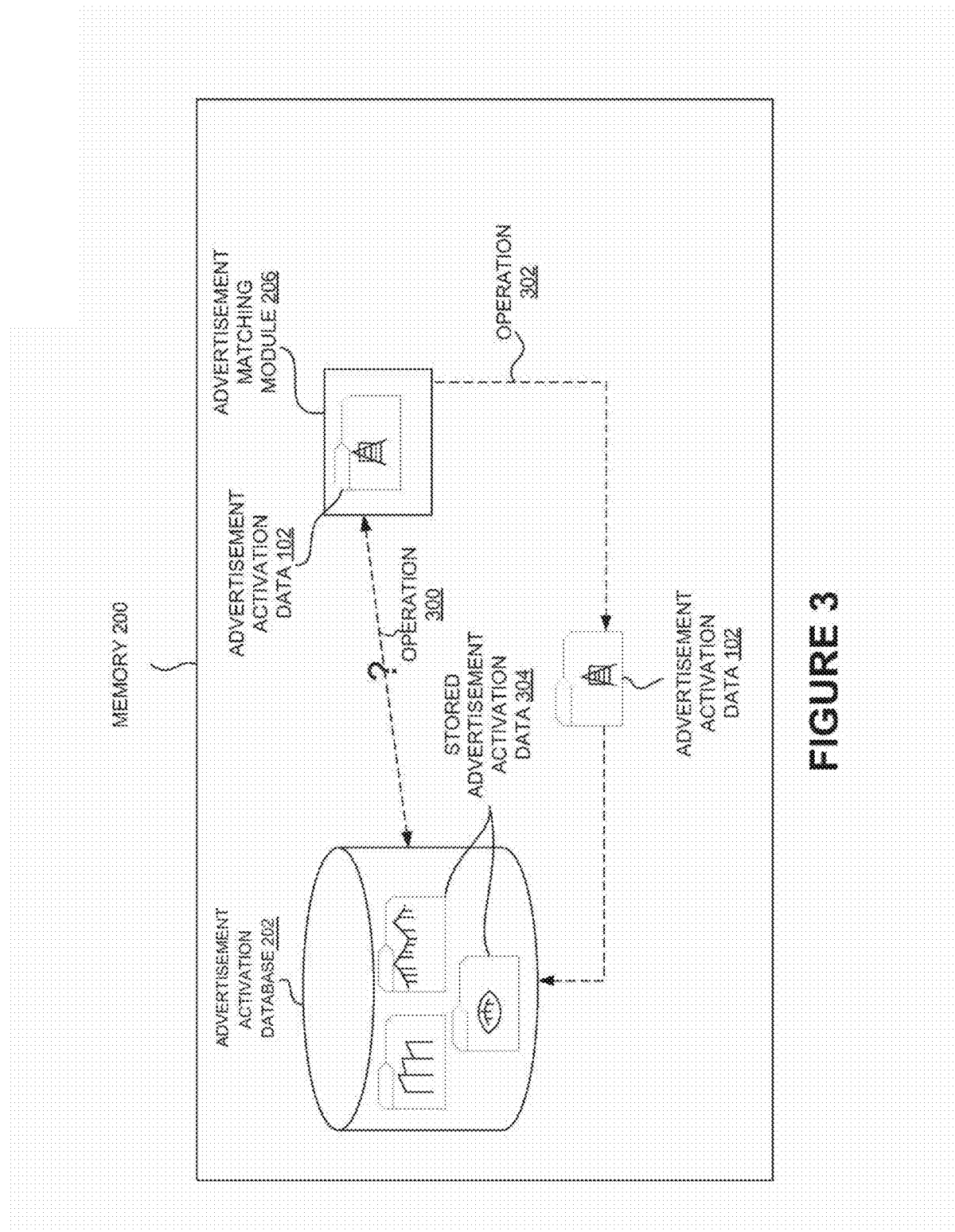
FIG. 3 is a schematic diagram of the memory of FIG. 2, demonstrating a query of an advertisement activation database for a stored copy of the advertisement activation data of FIG. 1 and an addition of the advertisement activation data to the advertisement activation database if the stored copy of the advertisement data is not found, according to one embodiment.

FIG. 3 is a schematic diagram of the memory 200 of FIG. 2, demonstrating a query of an advertisement activation database 203 for a stored copy of the advertisement activation data 102 of FIG. 1 and an addition of the advertisement activation data 102 to the advertisement activation database 203 if the stored copy of the advertisement activation data 102 is not found, according to one embodiment. In one embodiment, a method includes querying an advertisement activation database 203 for a stored copy of the advertisement activation data 102. The method also involves adding the advertisement activation data 102 to the advertisement activation database 203 if the stored copy of the advertisement data 304 is not found. In another embodiment, a server 100 comprises instructions to query the advertisement activation database 203 for a stored copy of the advertisement activation data 304, and add the advertisement activation data 102 to the advertisement activation database 203 if the stored copy of the advertisement data 304 is not found.

Figure 4:
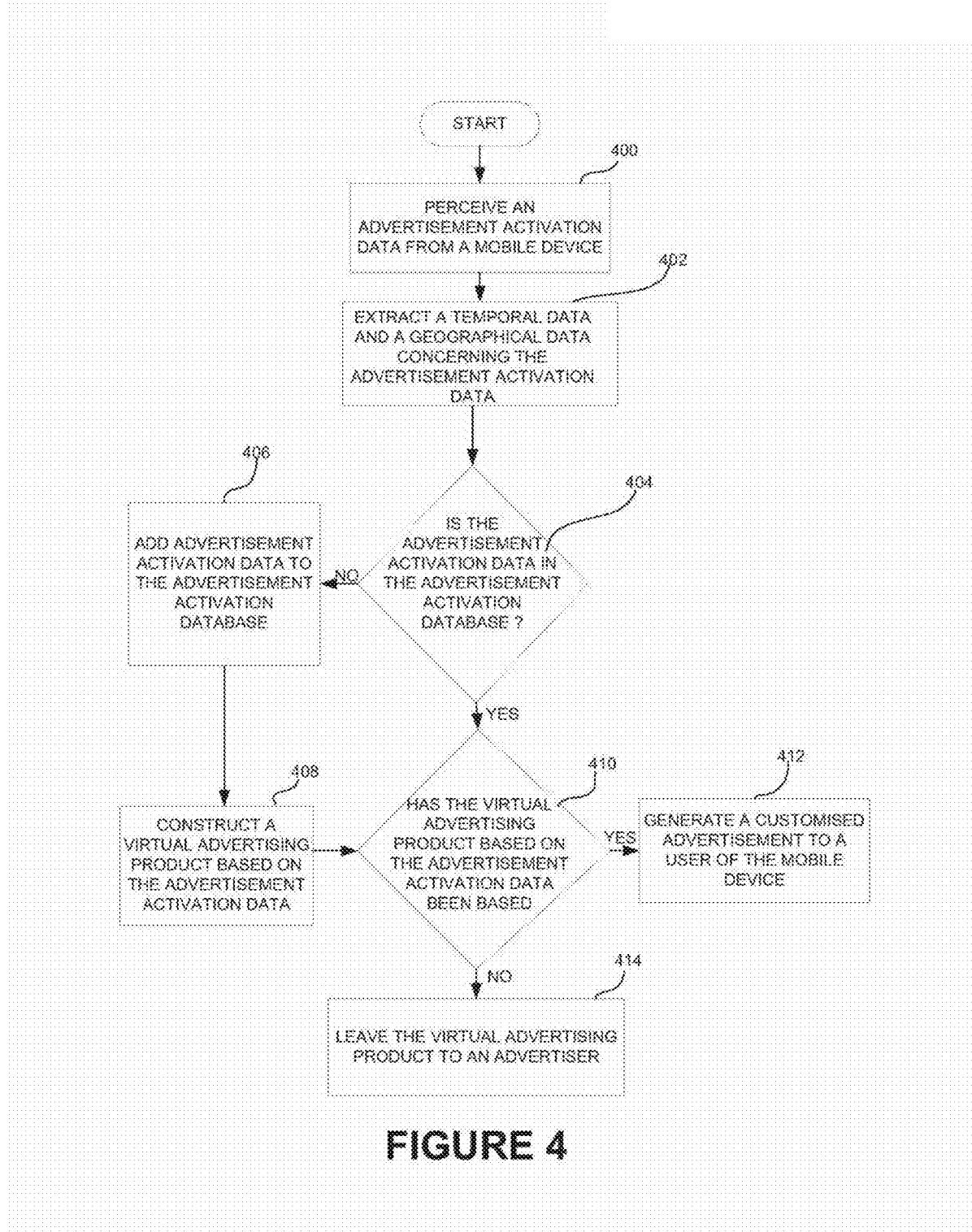
FIG. 4 is a flow chart demonstrating the processes and conditions to be met to generate a customized advertisement, according to one embodiment.

FIG. 4 is a flow chart demonstrating the processes and conditions to be met to generate a customized advertisement 112, according to one embodiment. Operation 400 involves receiving an advertisement activation data 102 from a mobile device 114. Operation 402 involves extracting a temporal data 104 and a geographical data 106 concerning the advertisement activation data 102. Condition 404 is a checkpoint determining whether the advertisement activation data 102 is stored in the advertisement activation database 203. If not, operation 406 adds the advertisement activation data 102 to the advertisement activation database 203, followed by operation 408, in which a virtual advertisement (advertising in figures) product 108 is constructed based on the advertisement activation data 102. If the advertisement activation data 102 is found in the advertisement activation database 203, condition 410 determines whether the virtual advertisement product 108 based on the advertisement activation data 102 has been constructed. If not, operation 412 leases the virtual advertisement product 108 to an advertiser. If the virtual advertisement product 108 based on the advertisement activation data 102 has been constructed, then operation 414 generates a customized advertisement 112 to a user 118 of the mobile device 114.

Figure 5:
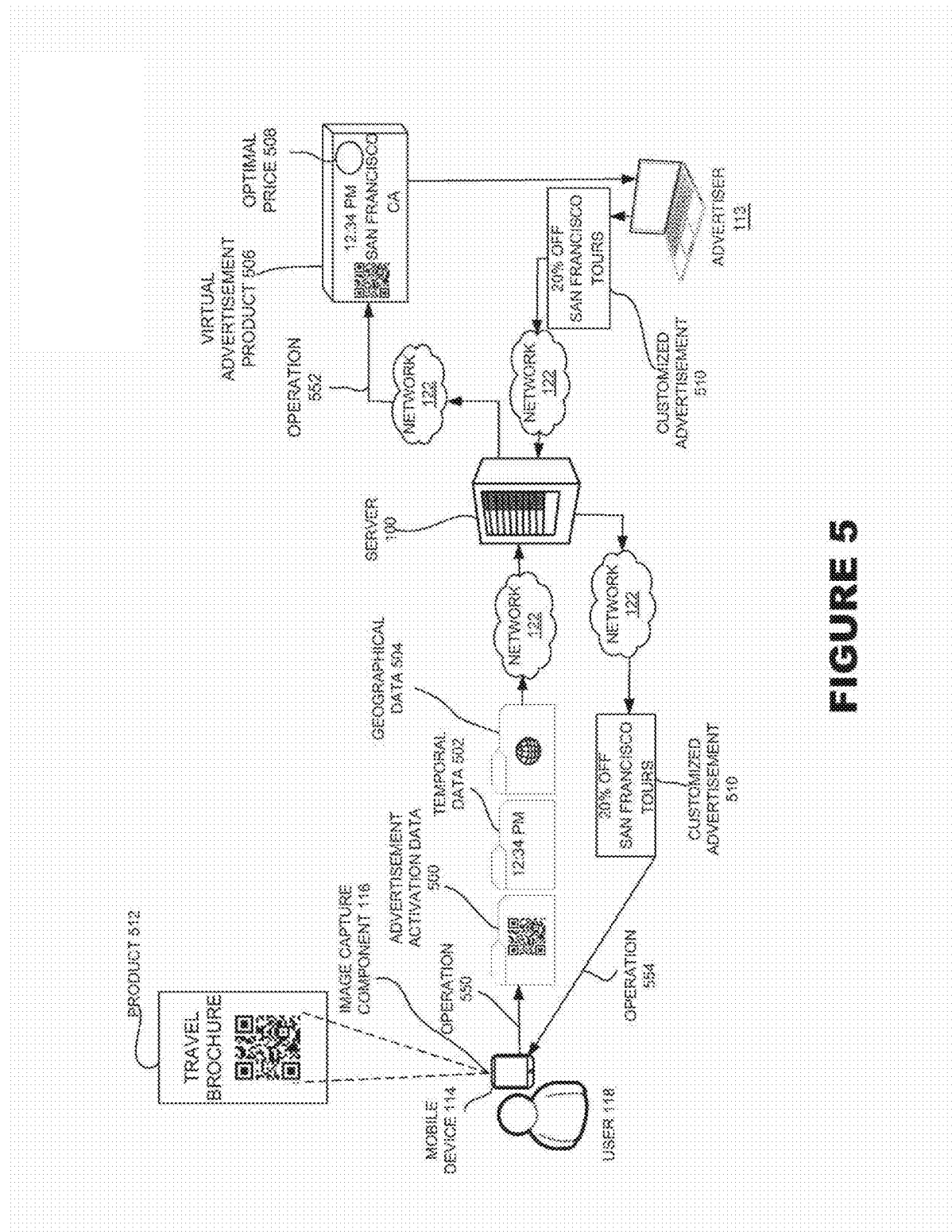
FIG. 5 is a schematic diagram of capturing an Image of a product to generate a customized advertisement to a user of a mobile device based on an extraction of a temporal data and a geographical data of an advertisement activation data and a calculation of an optimal price of a virtual advertisement product based on the customized advertisement, according to one embodiment.
Figure 6:
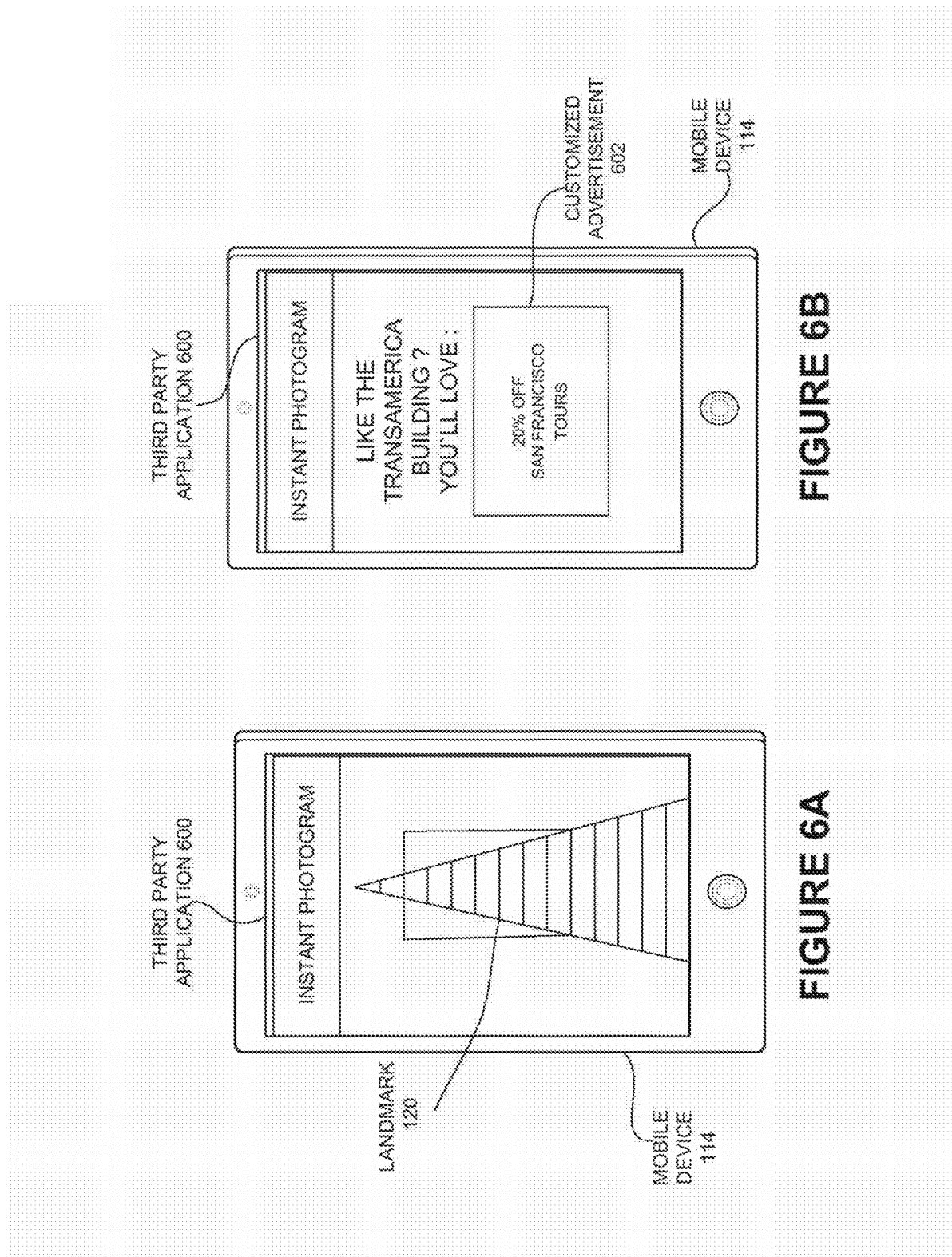
FIGS. 6A and 6B are user interface views of a third party application on a mobile device, depicting a presentation of a customized advertisement based on capturing an image of a landmark, according to one embodiment.
Figure 7:
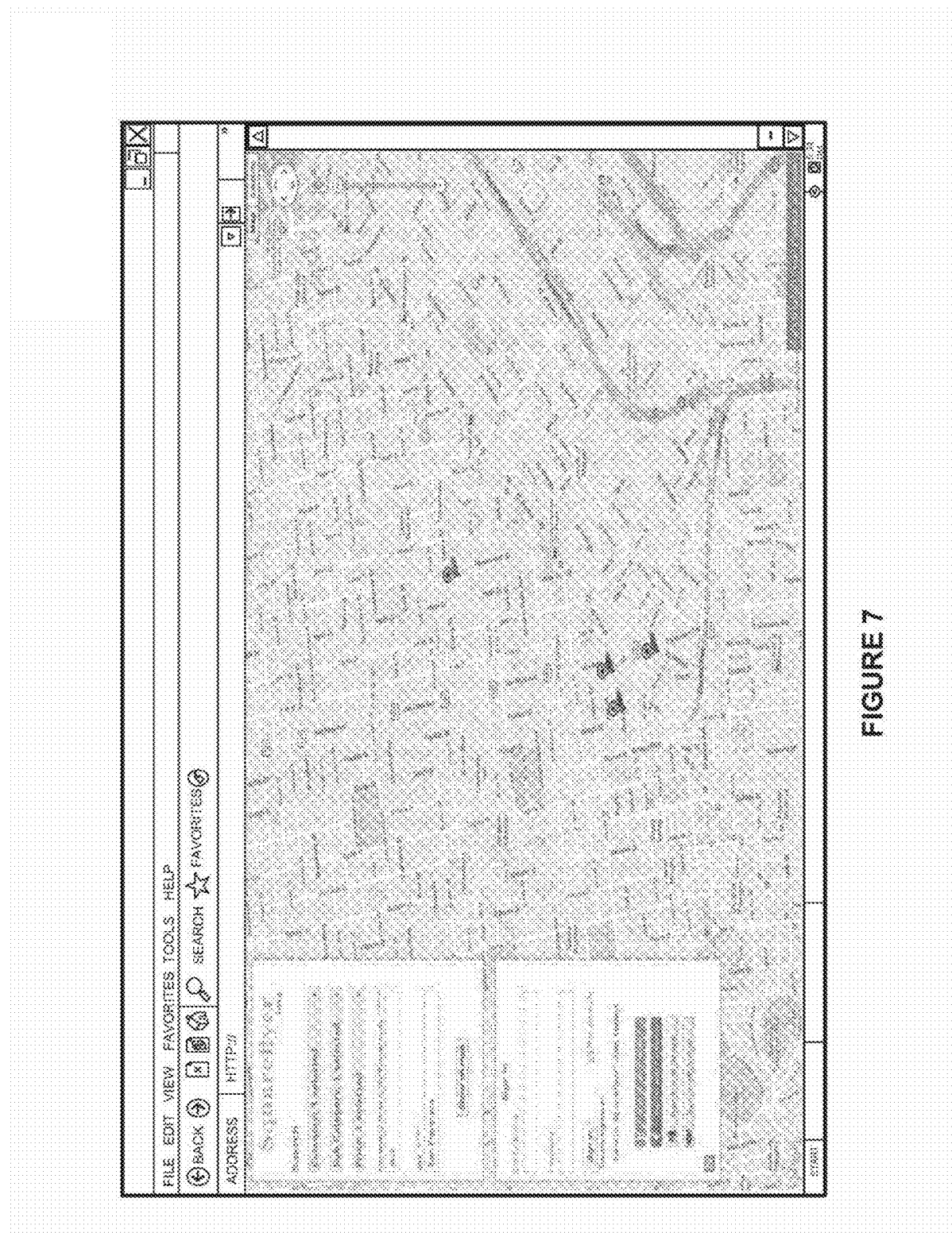
FIG. 7 is a user interface view depicting a user login screen, according to one embodiment.
Figure 8:
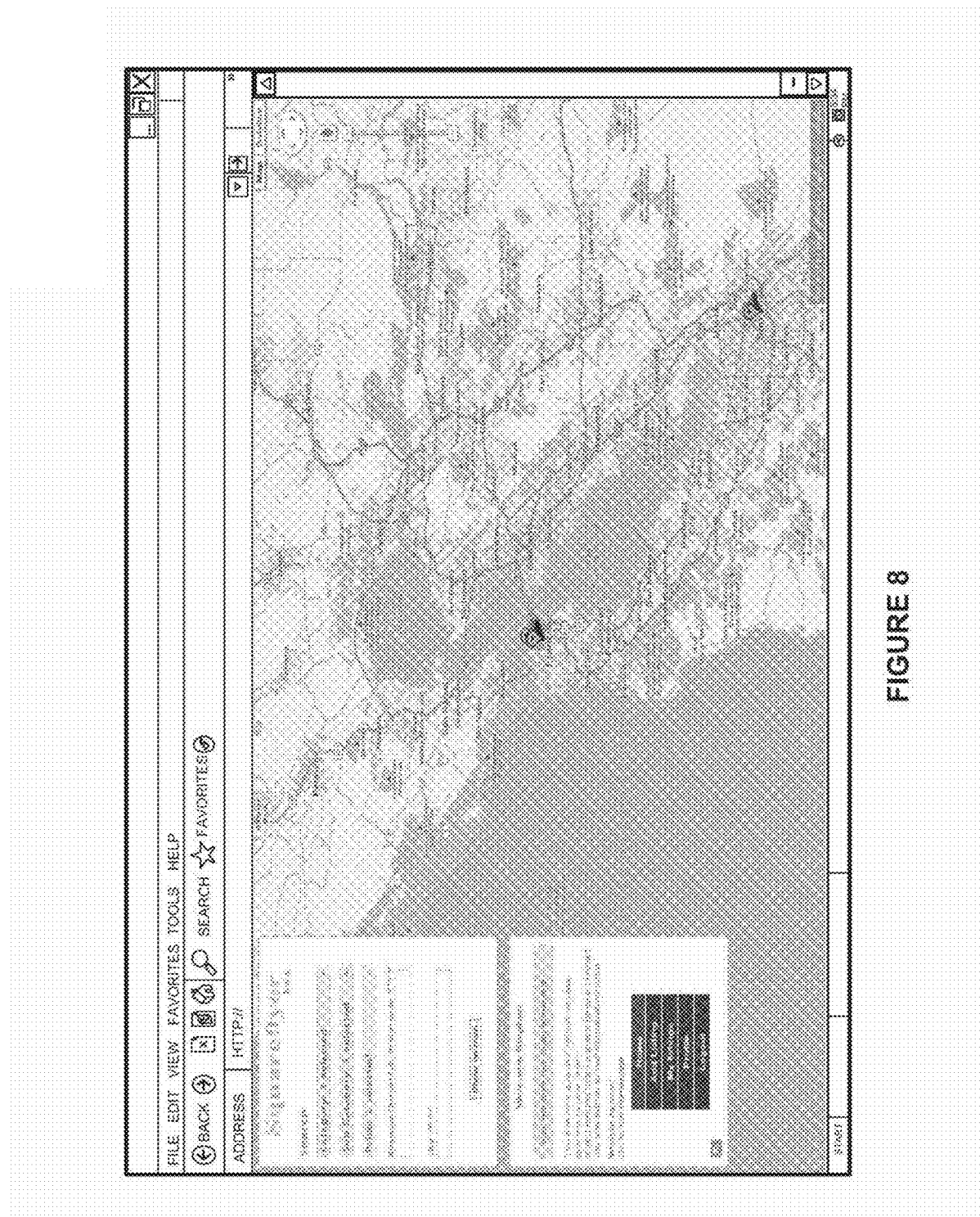
FIG. 8 is a user interface view depicting a user menu, according to one embodiment.

As another embodiment of FIG. 1, FIG. 5 is a schematic diagram of capturing an image of a product 512 to generate a customized advertisement 510 to a user of a mobile device based on an extraction of a temporal data 502 and a geographical data 504 of an advertisement activation data 500 and a calculation of an optimal price 508 of a virtual advertisement product 506 based on the customized advertisement 510, according to one embodiment.

FIGS. 6A and 6B are user interface views of a third party application 600 on a mobile device 114, depicting a presentation of a customized advertisement 602 based on capturing an image of a landmark 120, according to one embodiment. The customized advertisement 602 may be associated with the landmark 120 and may be displayed on the mobile device 114.

Figure 9:
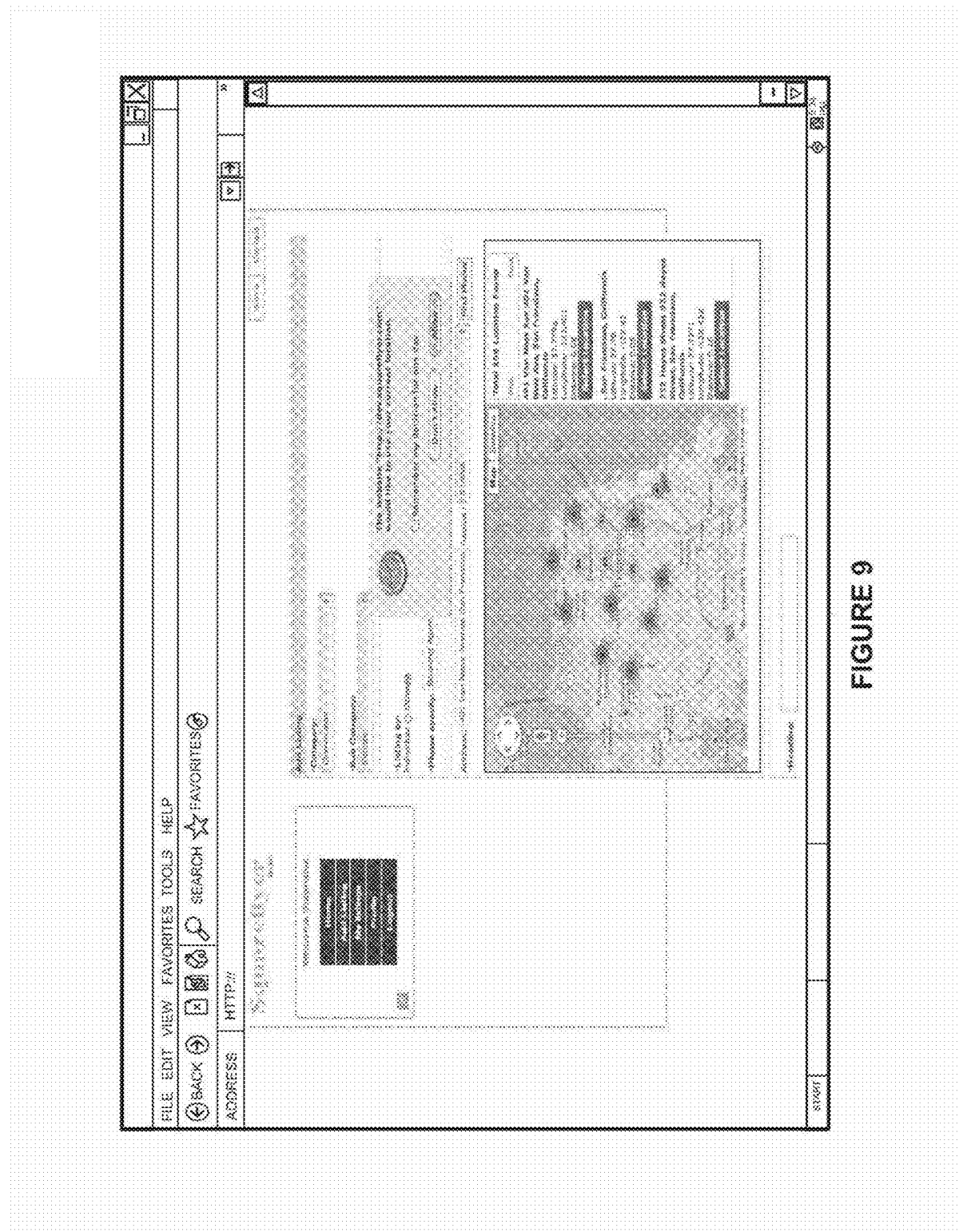
FIG. 9 is a user interface view providing a capability to a user to add a listing to a database, according to one embodiment.
Figure 10:
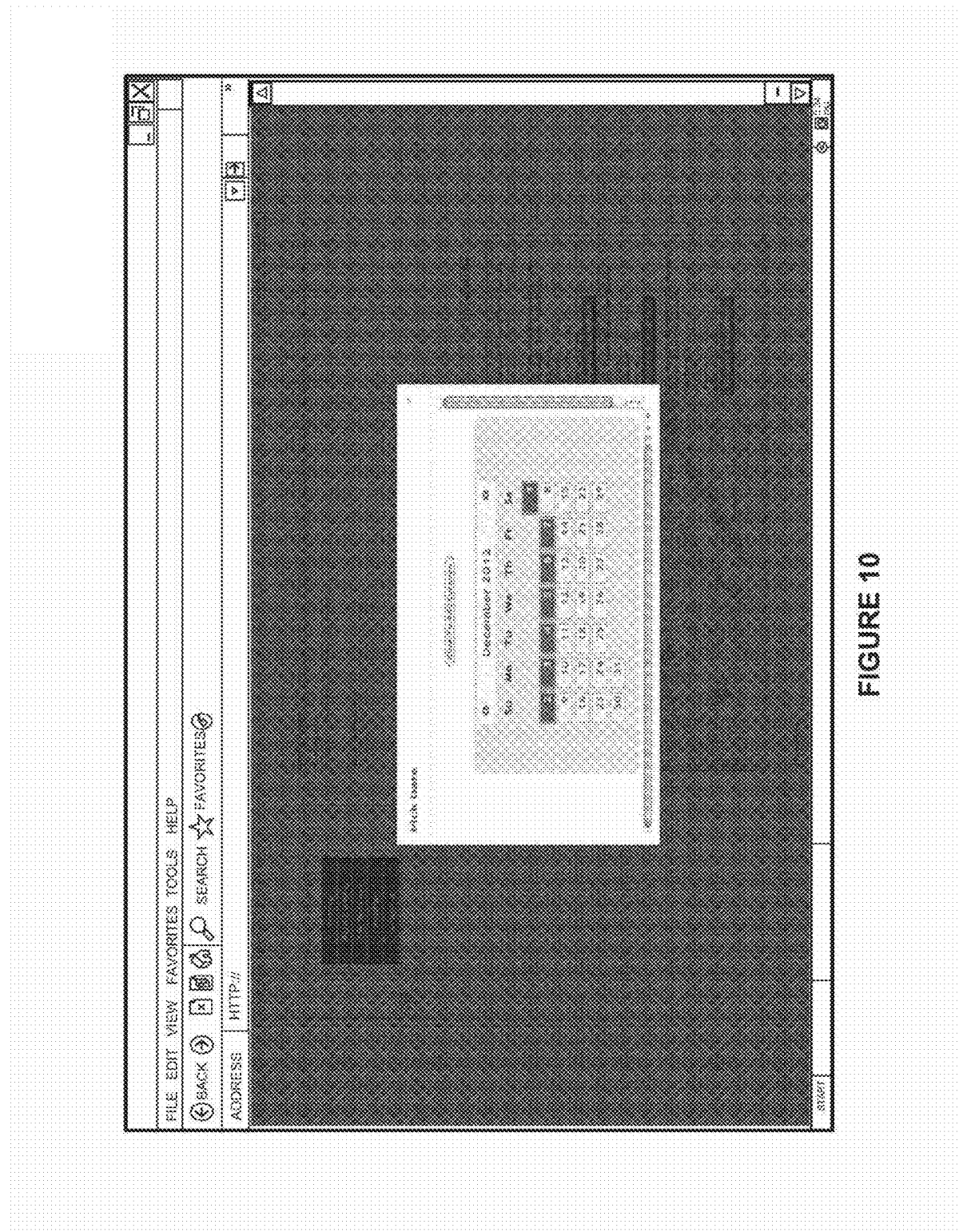
FIG. 10 is a user interface view providing a capability to a user to choose a date corresponding to the listing added in FIG. 9, according to one embodiment.
Figure 11:
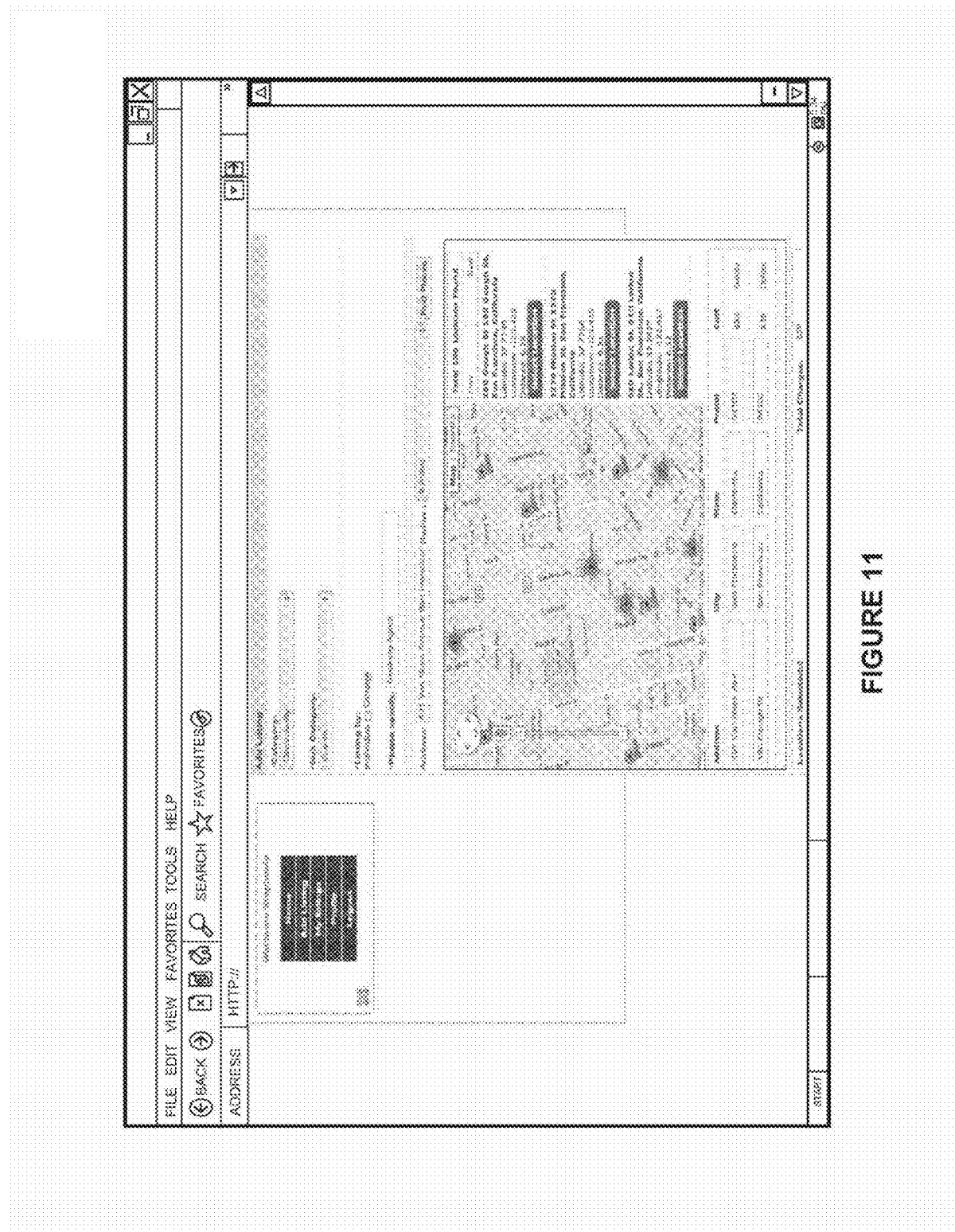
FIG. 11 is a user interface view illustrating location-based leasing and pricing information, according to one embodiment.
Figure 12:
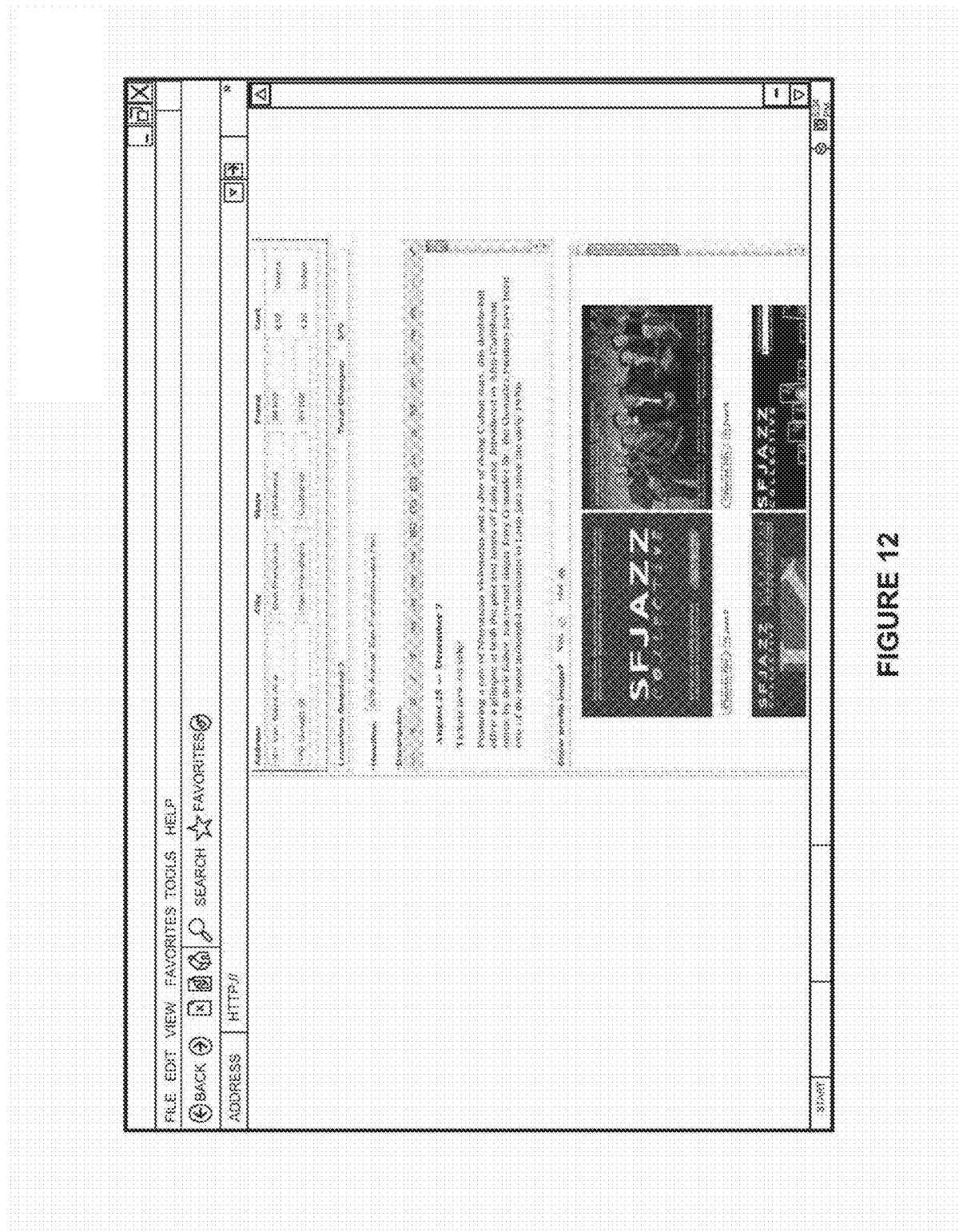
FIG. 12 is a user interface view providing a capability to a user to provide a description corresponding to the listing added in FIG. 9, according to one embodiment.
Figure 13:
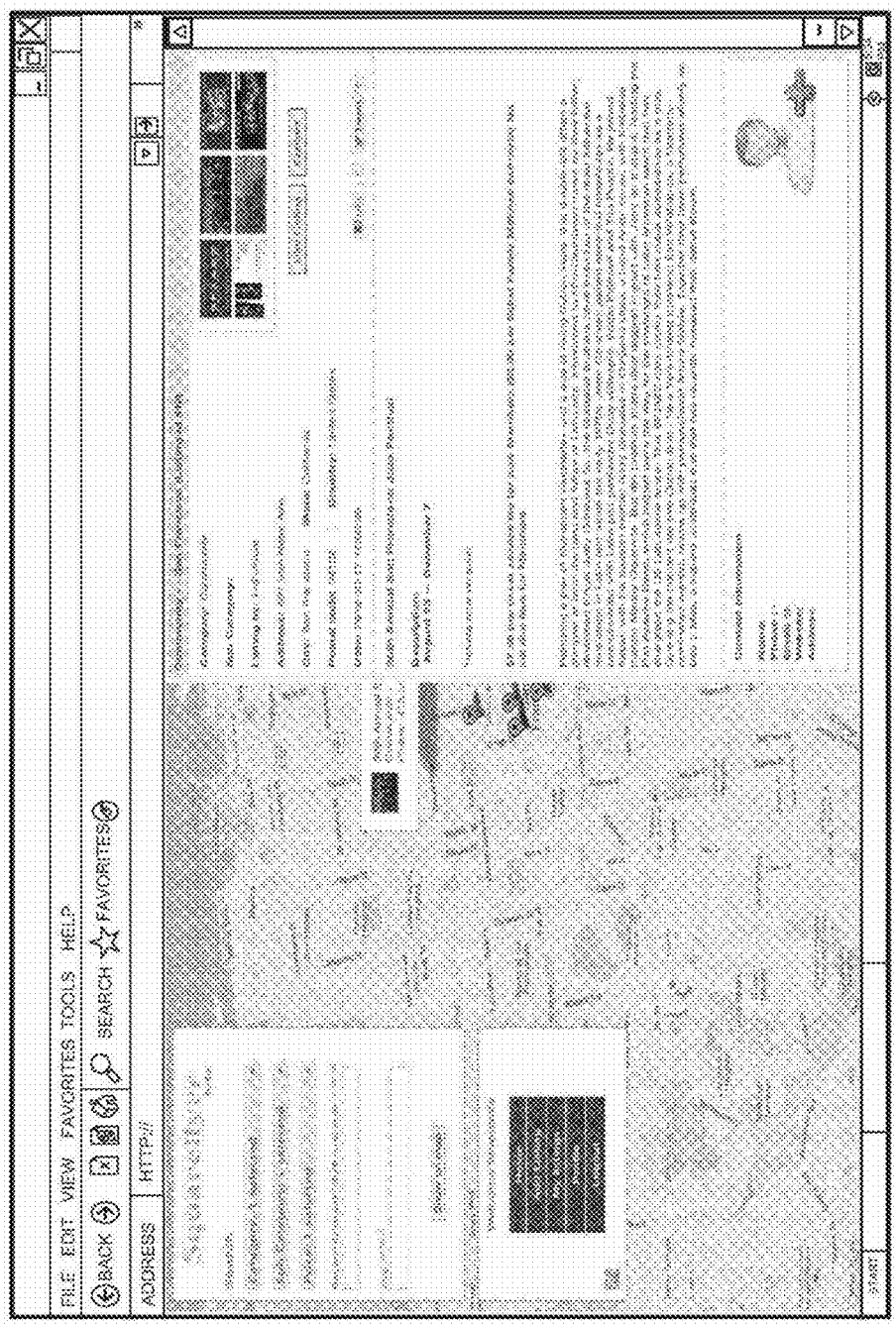
FIG. 13 is a user interface view providing a detailed view of the listing added in FIG. 9, according to one embodiment.
Figure 14:
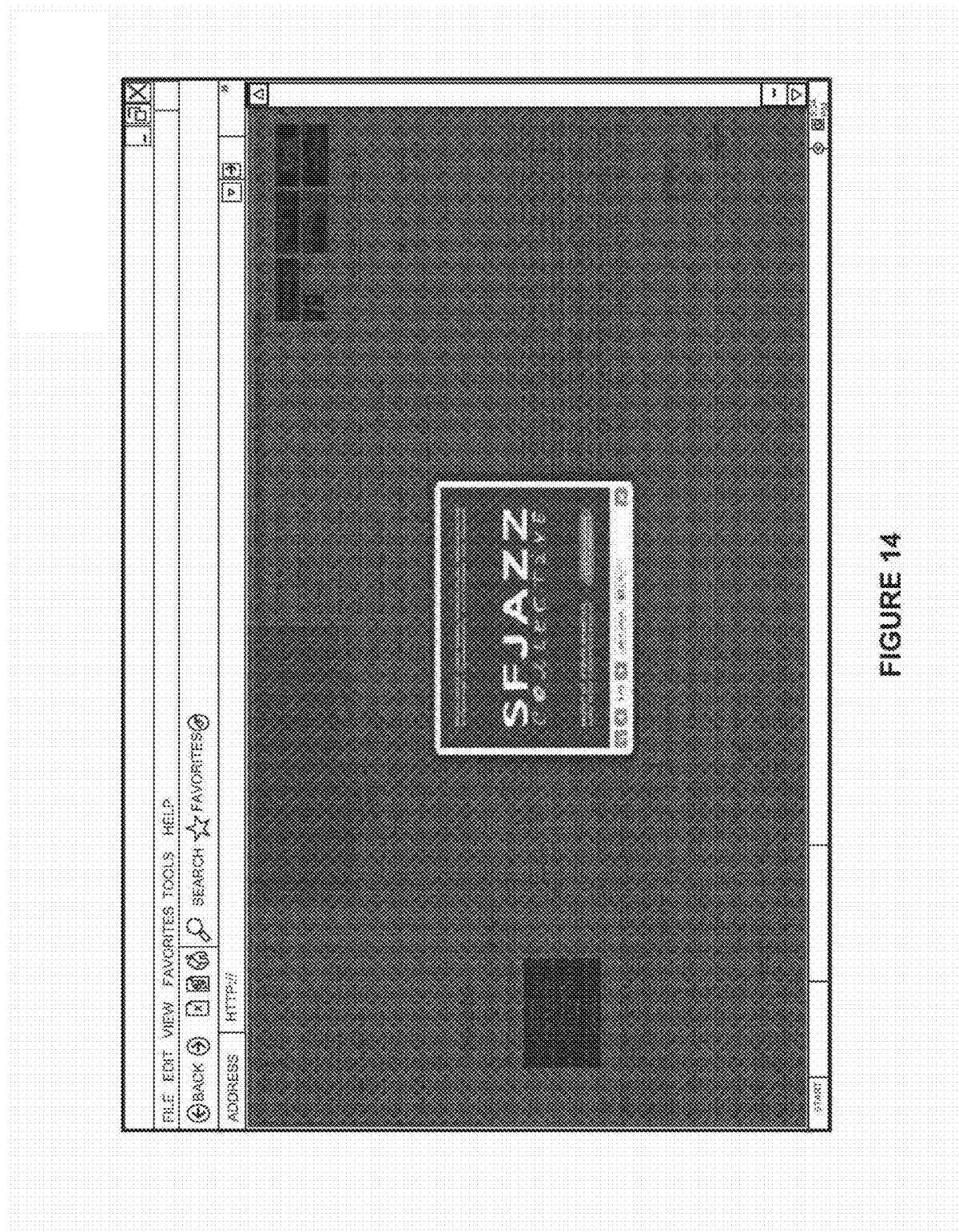
FIG. 14 is a user interface view showing an advertisement associated with the listing added in FIG. 9, according to one embodiment.
Figure 15:
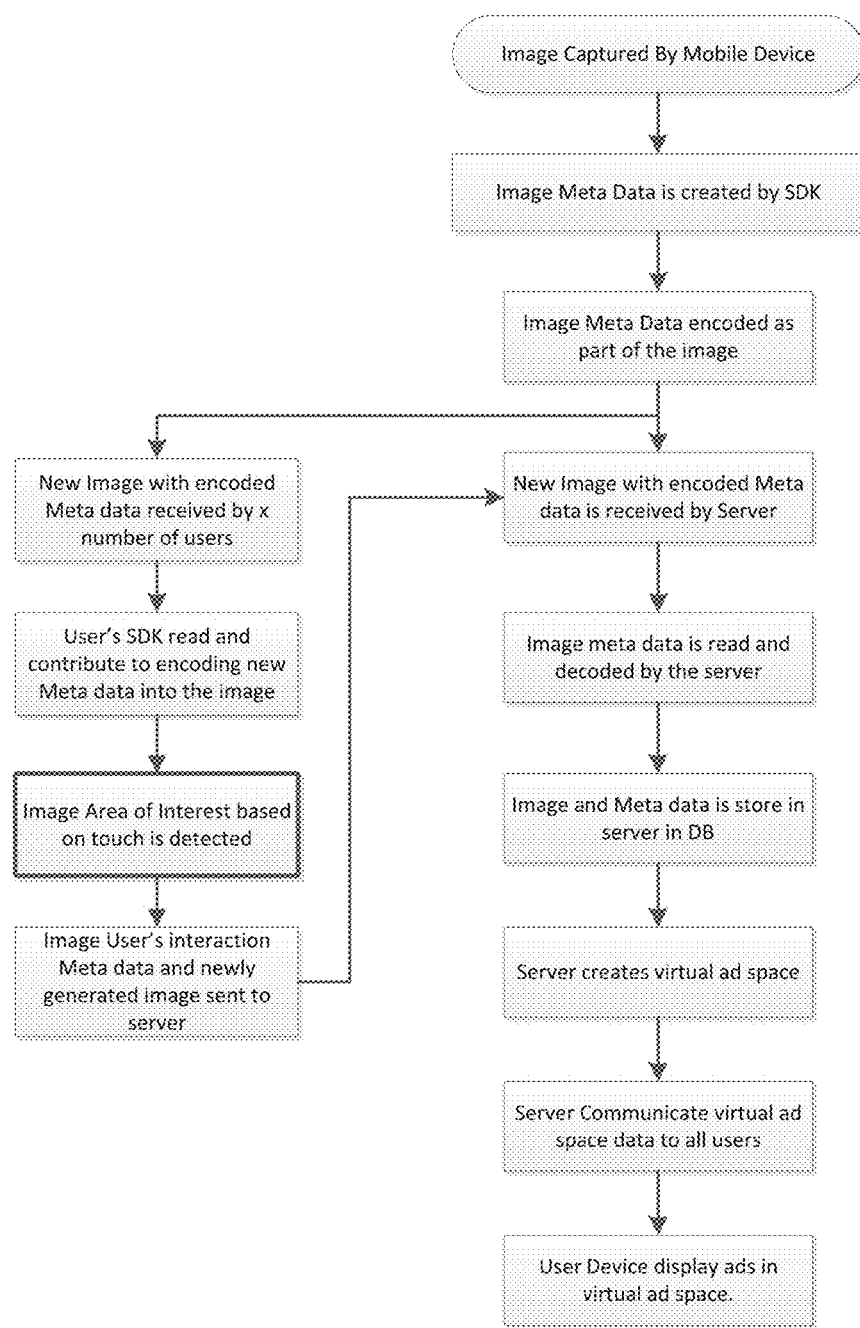
FIG. 15 shows a flow chart of a virtual ad space based on Image Machine Learning and distributed Image analysis process.

FIG. 14 is a user interface view showing a customized advertisement 112 associated with the listing added in FIG. 9, according to one embodiment.

An example will now be described in which the various embodiments will be explained in a hypothetical scenario. A mobile device user, 'John', who lives in 'Anytown', may use an application 'XYZ' on his mobile device to capture, send, receive, and/or share media with his friends, including 'Alex'. Alex, a citizen of 'Anothertown' is also a mobile device user and may also use XYZ application to capture and capture, send, receive, and/or share media with his friends. The XYZ application may utilize a plug-in or application programming interface (API) provided by an advertisement platform company 'ABC Inc.' to analyze images captured by a mobile device.

In one example, an advertisement may be placed in a newspaper, magazine, website, or any printed or digital media that features advertisements. XYZ application may be used to capture an image of said advertisement. The application may analyze the image and cross-reference the image with image advertisement data saved in a database associated with a server of ABC Inc. If the image match is found, the server may return more details associated with the advertisement. For example, if the advertisement is for a local concert in Anytown, XYZ application may return information related to ticket purchasing, location of the concert, description of the locale, past/future events at the locale, places to visit around the locale, etc. In another example, if the advertisement is related to a local eatery, the returned information may consist of reviews of the eatery by other users of XYZ application, a menu of the eatery, present/future lunch/dinner specials at the eatery, description of the cuisine, etc.

Figure 16:
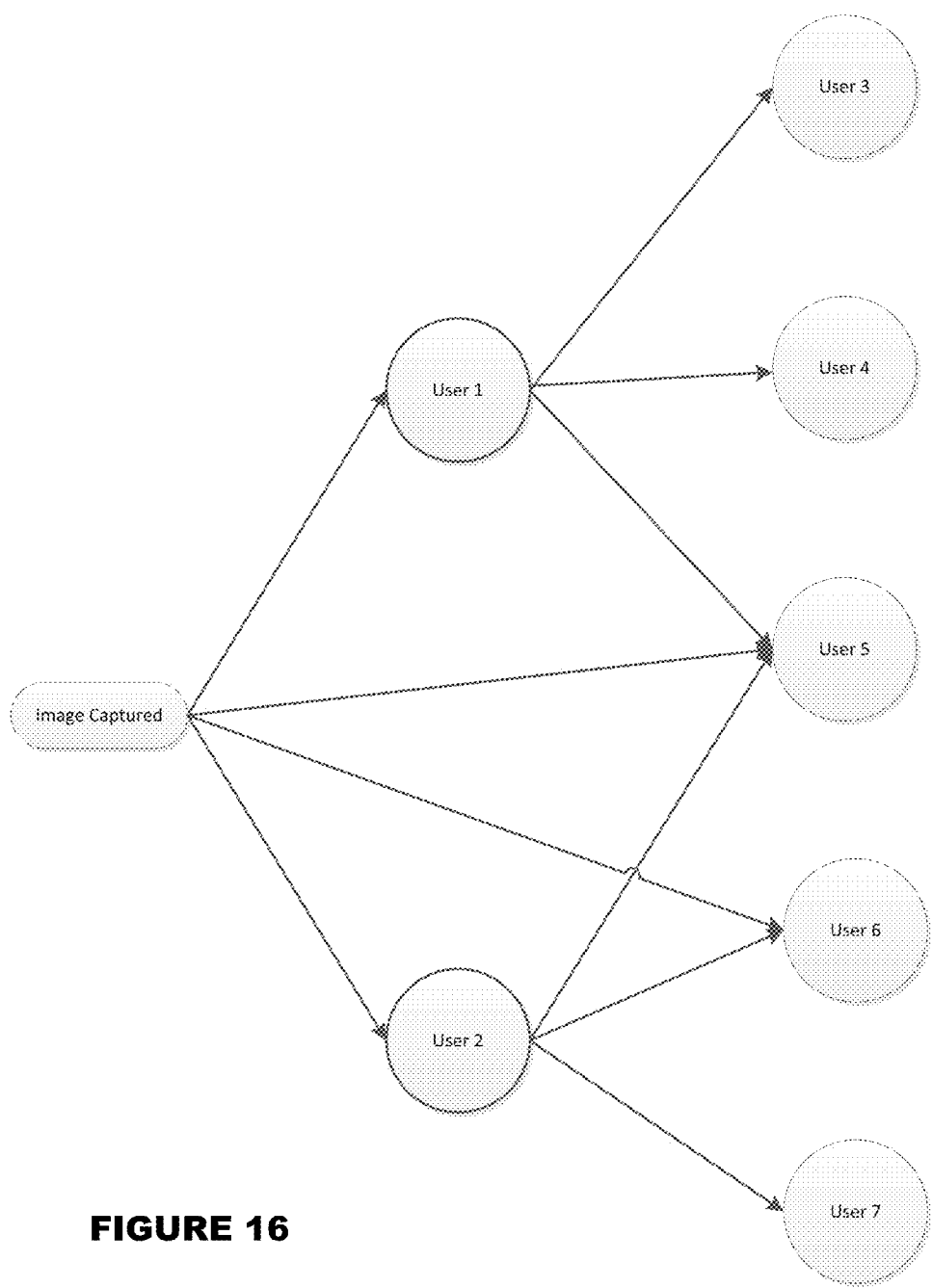
FIG. 16 shows a flow chart of an ad display in virtual ad space based on optimized image search and recognition of a sub-image detection system.
Figure 17:
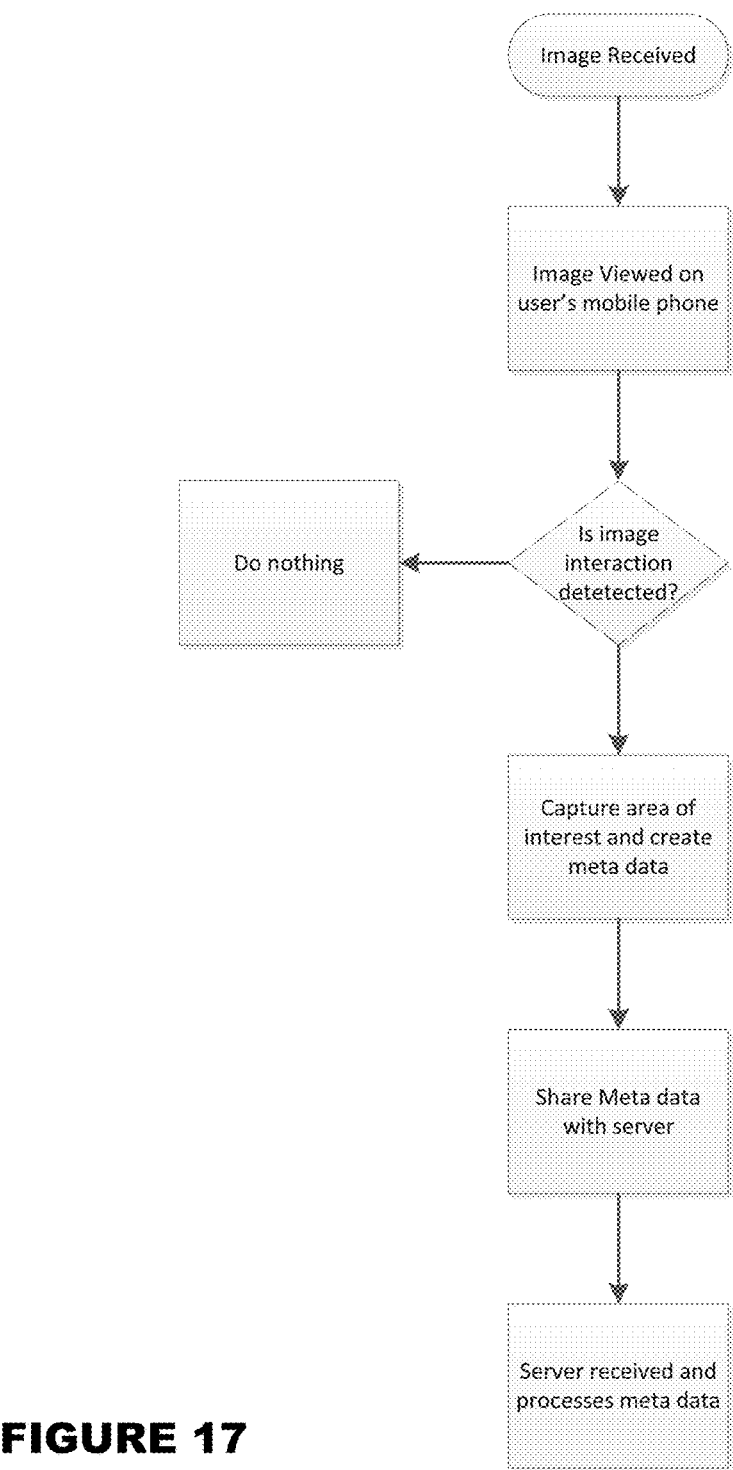
FIG. 17 shows a flow chart of detecting an area of interest during image viewing in an image ad placement system.

Referring to FIG. 16, when an image is first captured, the image meta data is encoded on the image itself. The image is shared with the server, User 1, and User 2. In this scenario, the image also is shared to other users (User 3, 4, 5, 6, 7). Each user in this scenario is a mobile user with a mobile device that is provided and has an SDK installed as part of the application that edit and share images. Each user SDK has the ability to read meta data encoded on the image, write meta data as an encoded pixels on the image, communicate with the server and send and query meta data and/or the image itself. The system is designed to display ads on each user's mobile phone based on the contents of the image and if the contents contained a pre-selected image that is known to the server. The server also determines what image is found at each stage, and the SDK installed on the user's phone determine if further analysis of the image is needed locally on the user's phone or by the server. The system, using the meta data that traveled as part of the image, minimizes the amount of work needed by each user's device and server to perform analysis on the image to find if a known image to the server is located as part of the image or within the image. The system also provides the real time feed on each area of the image that is the area of interest to the user. The area of interest is determined by the interaction the user do with the image. If the user zooms into one area of the image, such activity is captured by the SDK and communicated to the server. Based on this, the server can alter what the ads to display to one or more users. The level of interaction by more than one user with the image provides a level of accuracy to what is more relevant to the users within the image and what is not relevant. The placement is always adjusted based on the data received from all users.

As an example, suppose an image is captured of the landmark Transamerica building in San Francisco. But that image also captures a passing Lamborghini sports car. When the image is transferred to another user, the area of interest to that user may actually be the car, as indicated by his zooming the display toward that region of the image. In such case, it would be more appropriate to provide ads about sports cars to the user, rather than offering tours of San Francisco historic landmarks.

Figure 18:
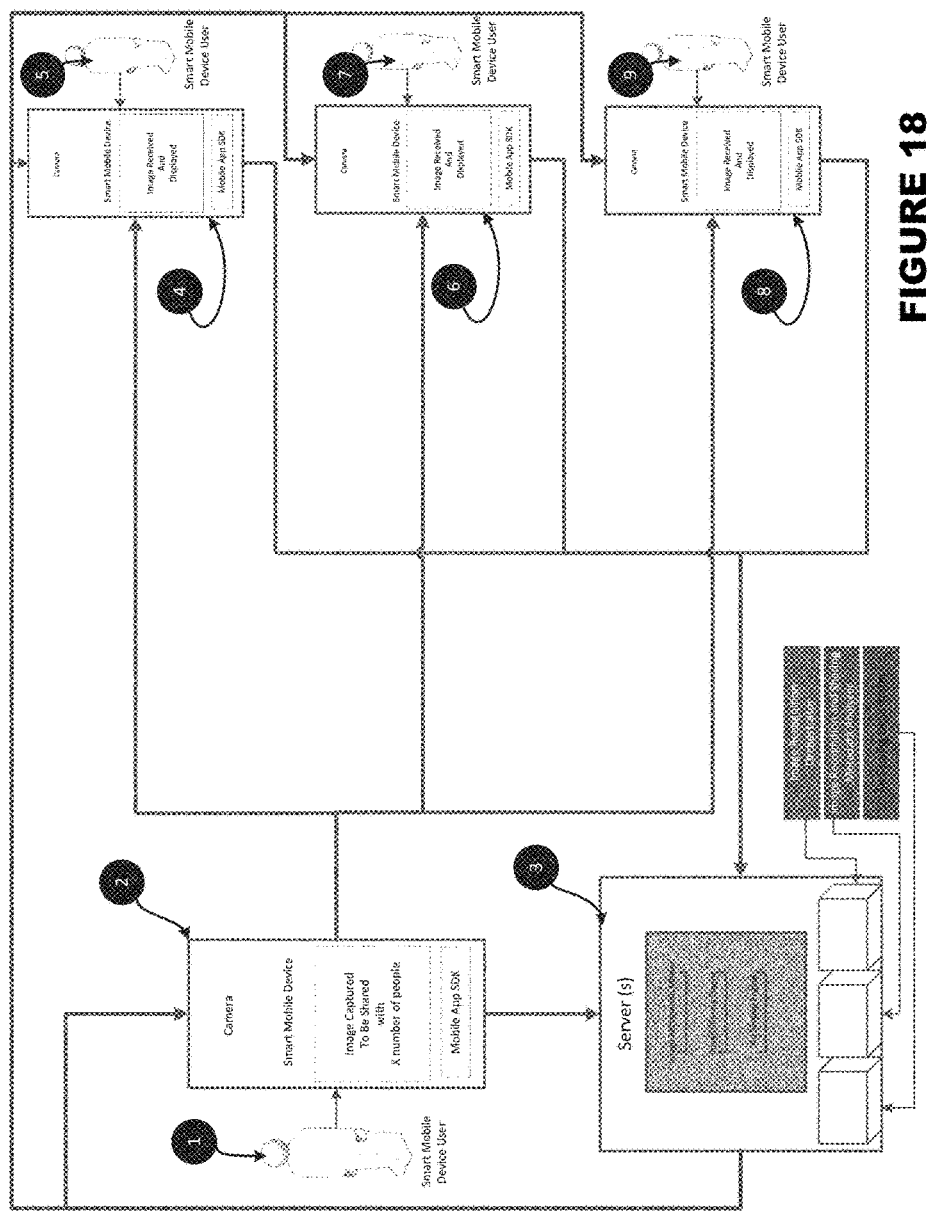
FIG. 18 shows a schematic diagram of a virtual ad space based on image captured and shared by mobile users equipped with a mobile device
Figure 19:
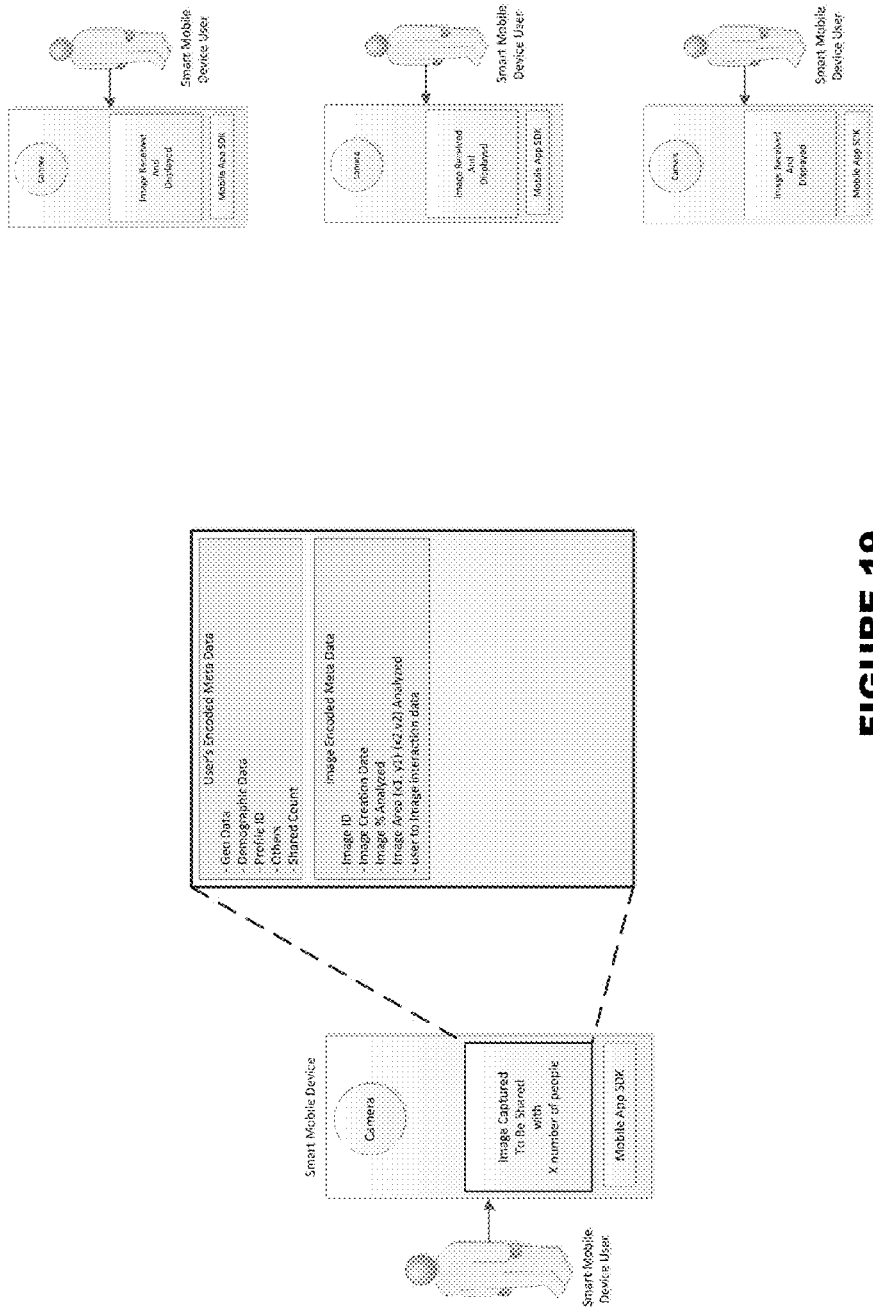
FIG. 19 shows how meta data is created by a user who capture an image in an image based virtual ad space system. The system uses a technique to encode data on the image itself as a way to minimize the workload needed to analyze the image by user's mobile device and server in an image sharing system.
Figure 20:
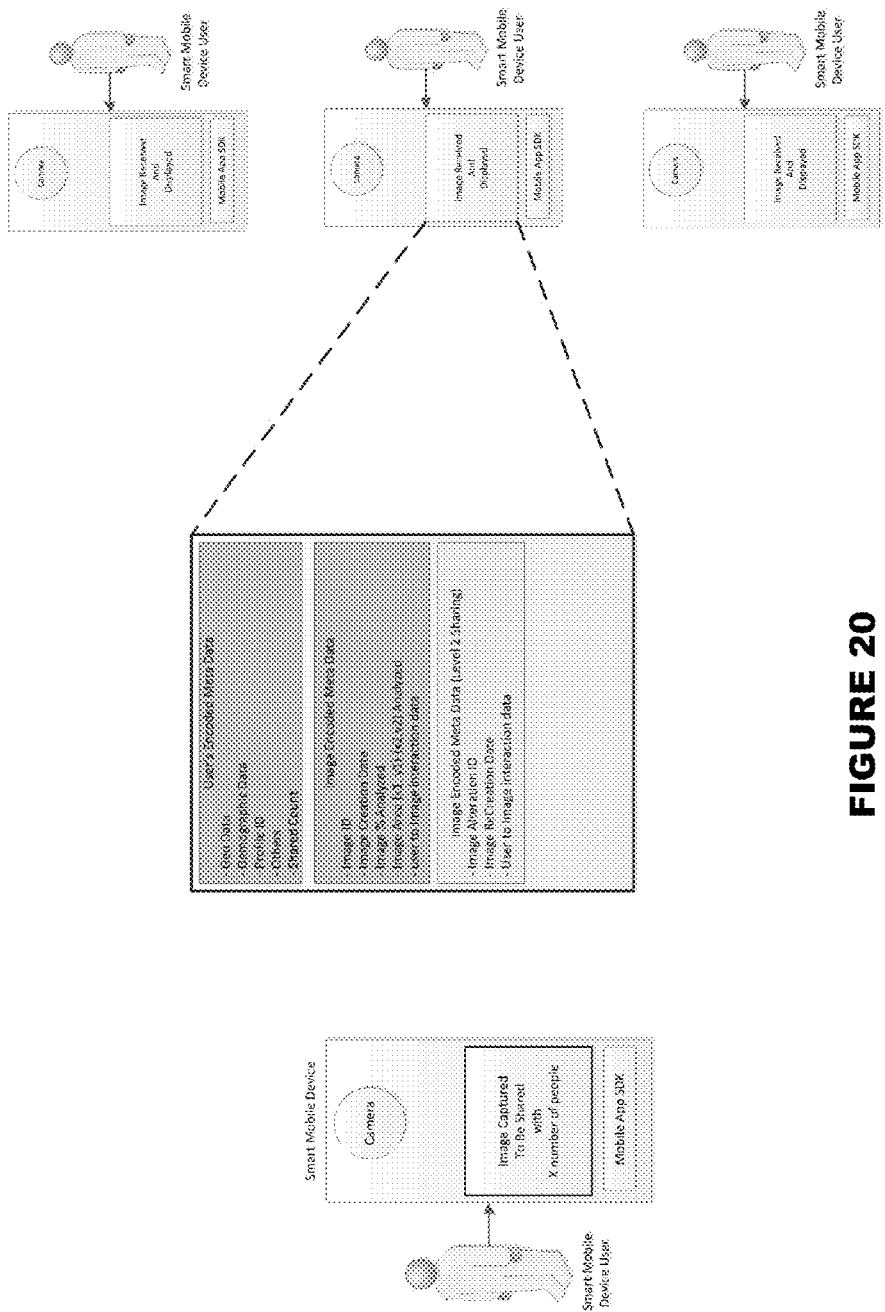
FIG. 20 shows how data is read by a user who receives an image in an image based virtual ad space system. The system uses a technique to encode data on the image itself as a way to minimize the workload needed to analyze the image by user's mobile device and server in an image sharing system.

Referring to FIG. 18 in the diagram provided, #1, #5, #7, and #9 refer to users of Smart Mobile Device; #2, #4, #6, and #8 refer to smart mobile devices equipped with cameras and running a mobile application SDK; and #3 refers to a server or a group of servers. User #1 captures an image with smart mobile device #2. Smart mobile device #2 is equipped and running a mobile application SDK. Once an image is captured, the SDK performs analysis on the image, create meta data of the image, and encode the meta data as part of the image. The data is encoded in the form of Hex colored pixels placed on the border or as an added border of the original image captured, and invisible to the user. The SDK subtract the width of the borders from the view where the image is showing in order not to alter the view of the original image captured. In this scenario user #1 will share the image with Server #3, and user, #5, #7, and #9. The image to be shared contains the original image and an encoded data as part of the image borders. When server (s) #3 receives the image, server #3 process the image, decode the meta data, store the original image in the database, store the meta data, and perform analysis on the image with the help of the meta data received from other smart mobile devices #4, #6, and #8. User #5, #7, and #9, receive the image on their corresponding smart mobile devices #4, #6, and #8. The mobile application SDK installed on device #4, #6, and #8, decode the meta data encoded on the image, perform analysis on the image, and communicate the data back to the server #3. Server(s) #3 receives the image with encoded meta data, meta data analysis of the image from smart mobile device #2, #4, #6, and #8 process the data, determine if a target sub-image appeared as part of the original image captured by smart mobile device #2, and based on the analysis, an advertising data is communicated to mobile device #2, #6, #8. Each mobile application SDK installed on mobile devices #2, #4, #6, and #8 has the ability to monitor for the interaction user #1, #5, #7, and #9 have with the image being captured, viewed and shared. As a result a new meta data is created by mobile device #2, #4, #6, and #8 that describes that interaction. The interaction data is communicated to the server #3. Server #3 uses the data to create an area of interest among the users on a section or a sub-image of the original captured image. The interactive meta data is used to update the advertising data being communicated to mobile device #2, #6, #8. In a scenario where user #1, #5, #7, and #9 decide at a later time to share the same image with another user of a smart mobile that has the mobile application SDK installed, the system does not perform any more analysis on the image, and the server #3 use existing and known data of the image to determine which advertising data should be communicated to the mobile device. As more and more users share the same image, the system achieve a higher efficiency and less redundancy analyzing the images being shared in order to display relative advertising based on a sub-image or content of the image itself.

Although the present embodiments have been described with reference to specific example embodiments, it will be evident that various modifications and changes may be made to these embodiments without departing from the broader spirit and scope of the various embodiments.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A computer implemented method, performed by a server, of leasing a virtual advertisement product partially in response to content of an image captured by a mobile device, wherein portions of the image processing workload are shared by other associated mobile devices, the method comprising:
   partial image analysis datum from the mobile device, the partial image analysis datum being produced by the mobile device, wherein the partial image analysis datum comprises an image datum or a multimedia datum captured from an image capture component, at least one of a temporal datum or a geographical datum related to the image datum or multimedia datum as a first set of metadata encoded around a border of the image in the form of Hex colored pixels, and analysis data that represents an intermediate stage of image analysis in the image processing component;
   partitioning the partial image analysis datum at the server into sub-tasks that are to be carried out by other associated mobile devices and storing the partitions into an associative memory;
   transmitting over the communications network the sub-tasks to the other associated mobile devices, wherein the sub-tasks comprise:
      removing the border from the image datum or multimedia datum to generate a raw image;
      storing the image datum or multimedia datum and the first set of metadata located in the removed border;
      performing image analysis on the image datum or multimedia datum to generate additional set of metadata;
      store the decoded additional set of metadata;
   receiving over the communications network processed sub-tasks that were processed by the other associated mobile devices;
   completing the image analysis based on the processed sub-tasks the partial image analysis datum to extract an advertisement activation datum from the partial image analysis datum, wherein the advertisement activation datum comprises an identification of an object present in the image data;
   querying a repository database for a stored copy of the advertisement activation datum;
   adding the advertisement activation datum to the repository database if the stored copy of the advertisement activation datum is not found;
   constructing a virtual advertising product based on the advertisement activation datum;
   calculating an optimal price for the virtual advertising product by analyzing at least one of the temporal datum or the geographical datum of the advertisement activation datum;
   leasing the virtual advertising product to an advertiser based on the optimal price calculated;
   providing the virtual advertising product to at least one of the associated mobile devices;
   receiving a notification that the image is shared with a second mobile device, wherein the second mobile devices is not one of the associated mobile devices; and
   improving image analysis efficiency for leasing the virtual advertising product by providing the virtual advertising product to the second mobile device without any additional analysis of the image.

2. The method of claim 1, wherein each associated mobile device further performs operations comprising:
   a. receiving an image from the server or another associated mobile device;
   b. displaying the image to a user;
   c. tracking user image viewing gestures of panning, zooming, and rotating;
   d. creating a region of interest datum to reflect a repositioned multimedia data in focus for the user; and
   e. encoding the region of interest datum in an additional set of metadata;
   wherein the region of interest datum arriving at the server via the additional set of metadata from the associated mobile device causes the server to adjust its criteria for advertising.

3. The method of claim 1, wherein each associated mobile device further performs operations comprising:
   a. receiving a region of an image from the server;
   b. performing some portion of image processing and feature vector collection to produce processed results; and
   c. sending the processed results back to the server;
   wherein the associated mobile device contributes to a distributed computation of image analysis and advertising feature vector collection.

4. The method of claim 1, wherein the operations further comprises generating a customized advertisement to a user of the mobile device based on an analysis of at least one of the temporal datum, the geographical datum, the optimal price, or a content of the advertisement activation datum.

5. The method of claim 1, further comprising decoding the advertisement activation datum when the advertisement activation datum is a coded datum comprising at least one of a quick response (QR) code, a scan code, a bar code, a matrix code, or a graphic code located in an image.

6. The method of claim 1, further comprising extracting a set of user data from a user of the mobile device, wherein the set of user data is taken into account when calculating the optimal price for the virtual advertising product.

7. The method of claim 6, wherein the set of user data comprises at least one of a gender datum of the user, an age datum of the user, or a contact information datum of the user.

8. The method of claim 1, further comprising continuously configuring the optimal price for the virtual advertising product based on an analysis of at least one of a set of user data, and a popularity metric of the virtual advertising product.

9. The method of claim 1, wherein the virtual advertising product comprises at least one of a text advertisement, an advertisement image, or a multimedia advertisement.

10. The method of claim 1, wherein the advertisement activation data is captured through a third-party photography sharing system implemented on the mobile device and the virtual advertising product is presented through the third-party photography sharing system implemented on the mobile device.

11. A computer-implemented process comprising:
receiving, from a first electronic device over a communications network, image data representative of a scene including an object with a first set of metadata encoded around a border of the scene in the form of Hex colored pixels, wherein the first set of metadata includes temporal and geographic information for the capture of the image data;
partitioning the image data into a plurality of image partitions;
sending a first image partition of the plurality of image partitions to a second electronic device over the communications network;
receiving, from the second electronic device over the communications network, partial image analysis data, wherein the partial image analysis data corresponds to processed image data of the first image partition that was processed by the second electronic device;
identifying at least a portion of the object present in the scene of the image data based on the partial image analysis data;
creating a virtual advertisement product based on the identification of the object; and
improving image analysis efficiency for leasing the virtual advertising product by presenting the virtual advertisement product to a user.

12. The computer-implemented process of claim 11, further comprising:
sending a second image partition of the plurality of image partitions to a third electronic device over the communications network;
receiving, from the third electronic device over the communications network, second partial image analysis data, wherein the second partial image analysis data corresponds to second processed image data of the second image partition that was processed by the third electronic device; and
identifying at least a portion of the object present in the scene of the image data based on the second partial image analysis data.

13. The computer-implemented process of claim 11, further comprising
receiving, from the first electronic device over the communications network, user data associated with the first electronic device, wherein at least one of the user data or the partial image analysis data is encoded in the image data as pixel data.

14. The computer-implemented process of claim 11, further comprising:
receiving a temporal datum or a geographical datum from the first electronic device; and
calculating an optimal price for the virtual advertisement product based on at least one of the temporal datum or the geographical datum.

15. The computer-implemented process of claim 14, further comprising:
receiving region of interest data from the first electronic device, wherein the region of interest data corresponds to a portion of the image data received from the first electronic device; and
adjusting at least one of the contents of the virtual advertisement product or the optimal price based on the region of interest data.

16. A system for leasing a virtual advertisement product partially in response to the content of an image captured by a mobile device, the system comprising a computing system including a processor configured to perform the following:
receiving, from a first electronic device over a communications network, image data representative of a scene including an object with a first set of metadata encoded around a border of the scene in the form of Hex colored pixels, wherein the first set of metadata includes temporal and geographic information for the capture of the image data;
partitioning the image data into a plurality of image partitions;
sending a first image partition of the plurality of image partitions to a second electronic device over the communications network;
receiving, from the second electronic device over the communications network, partial image analysis data, wherein the partial image analysis data corresponds to processed image data of the first image partition that was processed by the second electronic device;
identifying at least a portion of the object present in the scene of the image data based on the partial image analysis data;
creating a virtual advertisement product based on the identification of the object; and
improving image analysis efficiency for leasing the virtual advertising product by presenting the virtual advertisement product to a user.

17. The system of claim 16, further comprising:
sending a second image partition of the plurality of image partitions to a third electronic device over the communications network;
receiving, from the third electronic device over the communications network, second partial image analysis data, wherein the second partial image analysis data corresponds to second processed image data of the second image partition that was processed by the third electronic device; and identifying at least a portion of the object present in the scene of the image data based on the second partial image analysis data.

18. The system of claim 16, further comprising receiving, from the first electronic device over the communications network, user data associated with the first electronic device, wherein at least one of the user data or the partial image analysis data is encoded in the image data as pixel data.

19. The system of claim 16, further comprising:

receiving a temporal datum or a geographical datum from the first electronic device; and calculating an optimal price for the virtual advertisement product based on at least one of the temporal datum or the geographical datum.

20. The system of claim 19, further comprising:

receiving region of interest data from the first electronic device, wherein the region of interest data corresponds to a portion of the image data received from the first electronic device; and adjusting at least one of the contents of the virtual advertisement product or the optimal price based on the region of interest data.

* * * * *